United States Patent
Kandogan et al.

(10) Patent No.: US 10,970,053 B2
(45) Date of Patent: Apr. 6, 2021

(54) GENERATING SEMI-AUTOMATED VISUAL ANALYTICS SOLUTIONS

(71) Applicants: International Business Machines Corporation, Armonk, NY (US); Commonwealth Scientific and Industrial Research Organisation, Canberra (AU)

(72) Inventors: Eser Kandogan, Mountain View, CA (US); Ulrich Engelke, Sandy Bay (AU)

(73) Assignees: International Business Machines Corporation, Armonk, NY (US); Commonwealth Scientific and Industrial Research Oraanisation, Canberra (AU)

( * ) Notice: Subject to any disclaimer, the term of this patent is extended or adjusted under 35 U.S.C. 154(b) by 208 days.

(21) Appl. No.: 15/670,342

(22) Filed: Aug. 7, 2017

(65) Prior Publication Data
US 2019/0042212 A1 Feb. 7, 2019

(51) Int. Cl.
*G06F 8/38* (2018.01)
*G06F 16/26* (2019.01)
*G06F 8/30* (2018.01)
*G06F 8/71* (2018.01)

(52) U.S. Cl.
CPC ............... *G06F 8/38* (2013.01); *G06F 16/26* (2019.01); *G06F 8/311* (2013.01); *G06F 8/71* (2013.01)

(58) Field of Classification Search
CPC ...................................................... G06F 8/311
See application file for complete search history.

(56) References Cited

U.S. PATENT DOCUMENTS

| 8,510,288 B2 | 8/2013 | Mital et al. |
| 9,032,314 B2 | 5/2015 | Mital et al. |
| 9,098,858 B2 | 8/2015 | Xia et al. |

(Continued)

OTHER PUBLICATIONS

Siddiqui et al., "zenvisage: Effortless Visual Data Exploration," May 13, 2016.

(Continued)

*Primary Examiner* — Cesar B Paula
*Assistant Examiner* — John M Heffington
(74) *Attorney, Agent, or Firm* — Ryan, Mason & Lewis, LLP (57) ABSTRACT

Methods, systems, and computer program products for generating semi-automated visual analytics solutions are provided herein. A computer-implemented method includes automatically transforming a first version of specifications for visualization of a data analysis task being performed by a user into one or more subsequent versions of the specifications, wherein the transforming is based on data analysis visualization design guidelines; outputting at least one of the subsequent versions of the specifications to the user; processing user inputs, in response to the at least one outputted subsequent version of the specifications; automatically transforming the at least one outputted subsequent version of the specifications into one or more additional versions of the specifications based on the processing of the user inputs; and iteratively outputting the additional versions of the specifications until an indication of user satisfaction is obtained.

17 Claims, 5 Drawing Sheets

(56) References Cited

U.S. PATENT DOCUMENTS

| | | | | |
|---|---|---|---|---|
| 2007/0300185 | A1* | 12/2007 | Macbeth | G06F 9/451 715/825 |
| 2009/0024944 | A1* | 1/2009 | Louch | G06F 3/04817 715/764 |
| 2013/0024760 | A1* | 1/2013 | Vogel | G06F 9/44505 715/212 |
| 2014/0071138 | A1 | 3/2014 | Gibson et al. | |
| 2016/0085218 | A1* | 3/2016 | Pesonen | G05B 19/0428 700/28 |

OTHER PUBLICATIONS

Heer et al., Declarative language design for interactive visualization. Visualization and Computer Graphics, IEEE Transactions on, 16(6):1149-1156, 2010.

Kandogan et al., A grounded theory study on the language of data visualization principles and guidelines. IS and T International Symposium on Electronic Imaging, 2016.

Keim et al., Visual analytics: Definition, process, and challenges. In Information visualization, pp. 154-175. Springer, 2008.

Kindlmann et al., An algebraic process for visualization design. Visualization and Computer Graphics, IEEE Transactions on, 20(12):2181-2190, 2014.

Schulz et al., A design space of visualization tasks. Visualization and Computer Graphics, IEEE Transactions on, 19(12):2366-2375, 2013.

Yi et al., Toward a deeper understanding of the role of interaction in information visualization. Visualization and Computer Graphics, IEEE Transactions on, 13(6):1224-1231, 2007.

Kandogan et al., "From data to insight: Work practices of analysts in the enterprise," IEEE Computer Graphics and Applications, vol. 34, No. 5, pp. 42-50, 2014.

Kandel et al., "Enterprise data analysis and visualization: An interview study," in IEEE Visual Analytics Science & Technology (VAST), 2012.

Imhoff et al., "Self-service business intelligence," Empowering Users to Generate Insights, TDWI Best practices report, TWDI, Renton, WA, 2011.

Kandogan et al., "Labbook: Metadata-driven social collaborative data analysis," in Big Data, 2015 IEEE International Conference on. IEEE, 2015, pp. 431-440.

CSIRO, "Workspace," https://research.csiro.au/workspace/, 2016.

Kandogan et al., "Agile Visual Analytics in Data Science Systems," 2016 IEEE 18th International Conference on High Performance Computing and Communications.

S. S. Stevens, "On the theory of scales of measurement," 1946.

R. E. Roth, "An empirically-derived taxonomy of interaction primitives for interactive cartography and geovisualization," Visualization and Computer Graphics, IEEE Transactions on, vol. 19, No. 12, pp. 2356-2365, 2013.

Heer et al., "A taxonomy of tools that support the fluent and flexible use of visualizations," ACM Queue, vol. 10, No. 2, pp. 1-26, 2012.

Gotz et al., "Characterizing users' visual analytic activity for insight provenance," Information Visualization, vol. 8, No. 1, pp. 42-55, 2009.

Brehmer et al., "A multi-level typology of abstract visualization tasks," Visualization and Computer Graphics, IEEE Transactions on, vol. 19, No. 12, pp. 2376-2385, 2013.

B. Shneiderman, "The eyes have it: A task by data type taxonomy for information visualizations," in IEEE Symposium on Visual Languages, 1996, pp. 336-343.

Bostock et al., "D3 data-driven documents," Visualization and Computer Graphics, IEEE Transactions on, vol. 17, No. 12, pp. 2301-2309, 2011.

Engelke et al., "A Visual Analytics Framework to Study Honey Bee Behaviour," IEEE Int. Conference on Data Science and Systems, 2016.

* cited by examiner

GENERATING SEMI-AUTOMATED VISUAL ANALYTICS SOLUTIONS

FIELD

The present application generally relates to information technology, and, more particularly, to visual analytics.

BACKGROUND

The practice of data science can be ad hoc and agile, wherein needs and requirements evolve continuously and can be resolved through collaboration among multiple entities. To support such practice, visual analytics systems need to similarly evolve, as data, users, tasks, media, visualizations, and interaction capabilities change.

With respect to visual analytics, users of different backgrounds can interact with a multitude of data represented through a series of visualizations to support individual analytic tasks. Such interactions can occur on different devices, and can dynamically change as the analysis changes in connection with different users, task changes, new data, and new visualizations. However, challenges exist in supporting users through a visual analytics process via interactive visual interfaces, given ad hoc practices and continuously evolving needs and requirements.

Existing approaches are limited in that such approaches commonly consider only human perception-based guidelines, are not based on a formal language, and match merely to a limited set of solutions.

SUMMARY

In one embodiment of the present invention, techniques for generating semi-automated visual analytics solutions are provided. An exemplary computer-implemented method can include automatically transforming (i) a first version of specifications for visualization of a data analysis task being performed by a user into (ii) one or more subsequent versions of the specifications, wherein the transforming is based on one or more data analysis visualization design guidelines. Such a method can also include outputting at least one of the subsequent versions of the specifications to the user, processing one or more user inputs, in response to the at least one outputted subsequent version of the specifications, and automatically transforming the at least one outputted subsequent version of the specifications into one or more additional versions of the specifications based on the processing of the one or more user inputs. Further, such a method can additionally include iteratively outputting the one or more additional versions of the specifications until an indication of user satisfaction is obtained.

In another embodiment of the invention, an exemplary computer-implemented method can include step (a): generating, in connection with a data analysis task being performed by a user, a first version of specifications for the data analysis task, wherein the specifications describe characteristics of (i) a visual display of data being analyzed in connection with the data analysis task and (ii) one or more interactions that support the data analysis task on the visual display. Such a method can also include step (b): transforming, automatically via at least one computing device, the first version of the specifications into a second version of the specifications based on one or more data analysis visualization design guidelines; and step (c): outputting the second version of the specifications to the user via a display of a user device. Additionally, such a method can also include step (d): updating at least a portion of the second version of the specifications, based on input from the user, thereby creating an updated second version of the specifications; and step (e): transforming, automatically via the at least one computing device, the updated second version of the specifications into a third version of the specifications based on the input from the user. Further, such a method can include step (f): outputting the second version of the specifications to the user via a display of a user device; and step (g): iterating step (d), step (e) and step (f) until an indication of satisfaction by the user is obtained.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an embodiment of the present invention includes generating semi-automated visual analytics solutions. Optimizing and automating visual analytics processes, as detailed herein, is dependent on a holistic specification of the design space and a language that facilitates describing all elements and interactions therein. Accordingly, at least one embodiment of the invention includes formalizing such a specification to inform the design of a visual analytics algebra.

Visual analytics can represent a dynamic process that leverages the data processing capabilities of computational systems and the intuition, knowledge, and experience of its users. In at least one embodiment of the invention, multiple dimensions of needs and requirements are detailed, and an agile design process model is generated in which users and systems can cooperate to facilitate discovery in connection with different data and tasks that change during a given process. For example, work can be conducted collaboratively on multiple devices with varying interaction capabilities, and a design process model can benefit from an underlying language and algebra that not only defines operands and operators for performing visual analytics, but also specifies needs and requirements along with related guidelines, and produces visual analytic transformations.

In one or more embodiments of the invention, the design of visual analytic data science systems is considered holistically. In such an embodiment, design of visualization is not separated from analytics and data processing. User feedback throughout the analytic process is utilized as tasks change, and related needs and requirements change. To support collaborative analytics, such an embodiment can also include considering a multitude of users, each with respective needs and requirements.

Accordingly, at least one embodiment of the invention includes generating and/or implementing a visual analytics specification that respects the dimensionality and hierarchical nature of analytic tasks, as well as the interactions between the elements thereof. Also, by understanding the user of a visual analytics system, one or more embodiments of the invention can include generating a dynamic and agile visual analytics system. For such a purpose, at least one embodiment of the invention can include incorporating user models that include explicit knowledge (such as expertise, skills, domain knowledge, etc.) as well as implicit knowledge (such as preference for certain information or visualization types, etc.) about the user(s). Such types of explicit knowledge can, for example, be specified in user profiles, and such types of implicit knowledge can, for example, be learned from interactions between the user(s) and the system.

As further detailed herein, one or more embodiments of the invention can include techniques and/or systems for supporting users performing data analysis, given one or more specifications that describe characteristics of the (i) analytic task(s) to be conducted, (ii) the user(s) performing the task, (iii) the data that will be analyzed, and (iv) the device(s) on which the analysis will be conducted. Such specifications, as noted above, can include a structure text file such as, for example:

$S_1 = <D_1, T_1, U_1, M_1, V_1, I_1>$
wherein
$D_1 = <A_{age}, A_{gender}, A_{location}>$,
$T_1 = <Understand, \Pi_{(A\_belief)}(D_1)>$,
$U_1 = \{$expertise: $\{$
 "analytics":"intermediate"
 "visualization":"intermediate"
 "environment":"advanced"$\}\}$
$M_1 = \{$display:$\{$size:10$\}$,
 interaction:$\{$touchscreen:true$\}\}$
$V_1 = \{ \}$
$I_1 = \{ \}$ Additionally, such an embodiment can also include producing one or more specifications that describe characteristics of (i) the visual display of the data and (ii) the interactions that support analysis on the display.

Such an embodiment can be, for example, employed by a computing system, working iteratively over the produced specifications of the task(s), the user(s), the data, the visualization and the interactions, based on guidelines which are (i) specified using a computer-interpretable language that transforms the produced specifications and produces another set of specifications based on one or more specified conditions. In one or more embodiments of the invention, the first specification can include data, a high-level task, information about the user and display, etc. Given these types of items, one or more embodiments of the invention can include breaking-down the task into smaller tasks, eventually to interactive visual representations. Examples of conditions such as noted above can include, for instance, "If <data contain categorical values>," "If <display size is small>," "If <tasks is compare>," etc. Also, such guidelines can be stored in a repository accessible by the computing system in an inner loop, wherein the inner loop includes a sequence of the transformations made by the computing system. Further, the sequence of transformations can also be presented to the user on the relevant device(s).

Additionally, an embodiment of the invention such as detailed above can be employed by the user(s) of the system in an outer loop, wherein the outer loop applies one or more updates to any part of the given specifications by enabling interaction with a user interface of the system, and triggering the computing system, in response to user input, to generate another sequence of transformations. By way of example, a user can interact with a visualization to examine data, wherein such a visualization can include a widget whereby the user selects a subset of the data. Additionally, such a visualization can include a user interface which provides the user a number of options as next steps. A goal of the user, in generating additional sequences of transformation, can include analyzing data, such as for example, a particular range of the data. Such actions can be repeated, for example, until the user(s) are satisfied with the outcome of the analytic task performed.

Accordingly, and as further described herein, one or more embodiments of the invention include implementing a unifying formal language to represent multiple dimensions of a task or problem, which enables concurrent optimization. Such optimization can include concurrently considering multiple conditions on aspects of users, data, visualization, interaction, tasks and device(s). By way of example, a particular set of circumstances might include a user that is an expert, and a device having a large screen, and a data collection that is large. Further, at least one embodiment of the invention can include generating a mixed initiative incremental approach, wherein human input can be utilized to guide visual analytics. Also, such an embodiment can include implementing a repository of guidelines represented as rules over the dimensions of the analysis task or problem.

Figure 1:
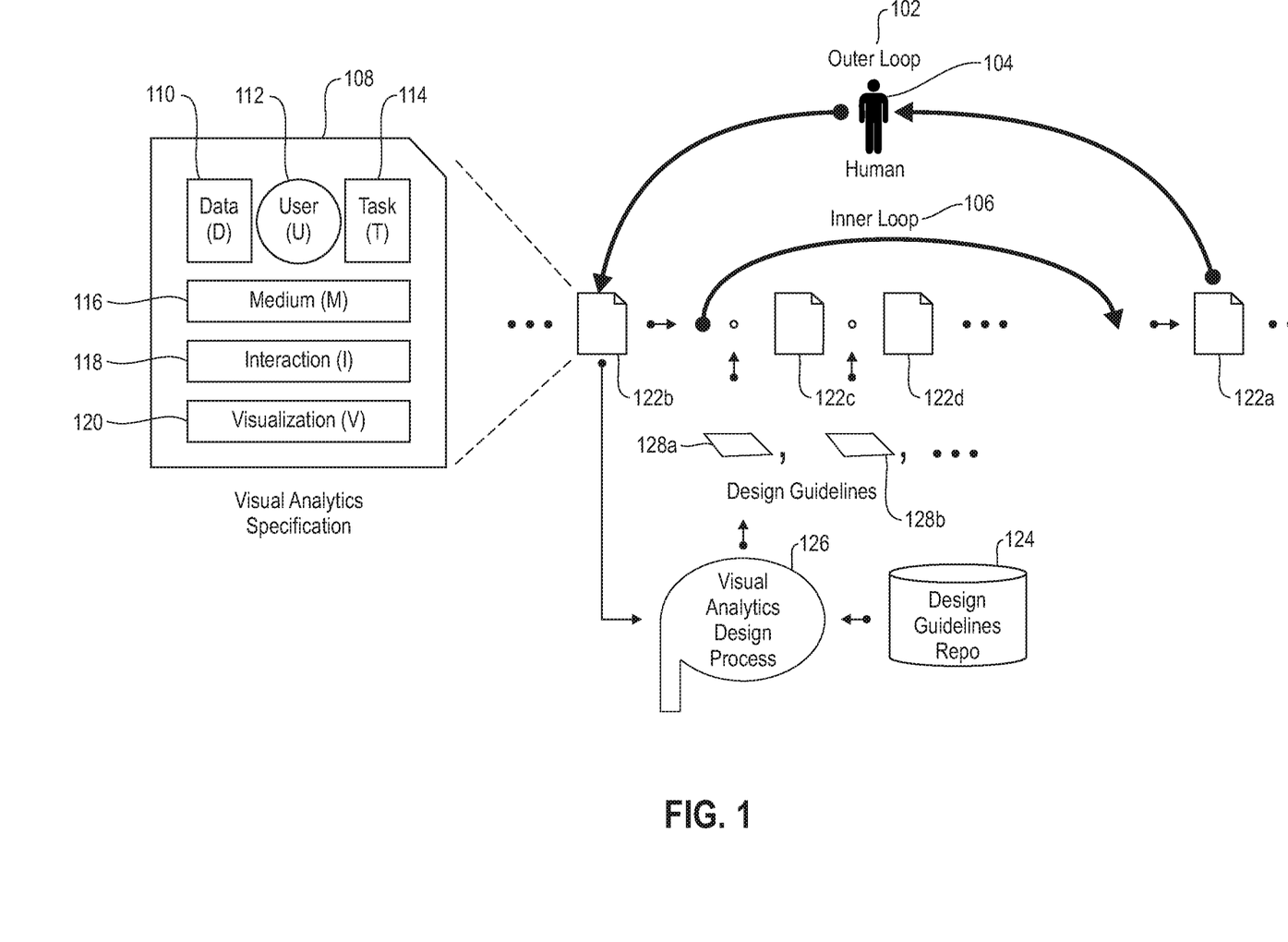
FIG. 1 is a diagram illustrating an overview of the visual analytics design process, according to an example embodiment of the invention.

FIG. 1 is a diagram illustrating an overview of the visual analytics design process, according to an example embodiment of the invention. By way of illustration, FIG. 1 depicts an overview of a visual analytics design process based on a holistic specification of the design space and design guidelines for iterative updates of the specification. Specifically, FIG. 1 depicts a visual analytics design process implemented via specifications (S) 122a, 122b, 122c, 122d, etc. (collectively referred to herein as specifications 122), which encapsulate all dimensions of the design space (Σ), and design guidelines (Γ) 128a, 128b, etc. (collectively referred to herein as design guidelines 128), which define the iterative steps taken to transform one specification into another specification at any point during the visual analytics process. The design guidelines 128 can be provided by and/or derived from a visual analytics process component 126, which can obtain inputs from a design guidelines repository 124. These guidelines 128 can be externally input into the systems, as well as learned from users as the users interact with the system. As used herein, a repository can refer to a rule database that represents each guideline, its conditions, its actions, etc. Rules in the repository can derive much of the transformations in one or more implementations of the described system.

FIG. 1 also depicts a visual analytics specification set 108, which includes the dimensions of the design space. Such dimensions, as illustrated, can include, data (D) 110, user (U) 112, task (T) 114, medium (M) 116, interaction (I) 118, and visualization (V) 120. Design guidelines 128 define the iterative steps taken to transform from one specification (such as, for example, specification 122b) into the next specification (such as, for example, specification 122c) at any point during the visual analytics process until, for example, a desired insight is reached by the user. Such transformations can occur in two separate but interrelated loops: a system-initiated inner loop 106, wherein given specifications and applicable guidelines 128 are applied; and a user-initiated outer loop 102, wherein for a given visual analytics solution, the human user 104 analyzes the data and updates requirements as insights emerge, potentially leading to another system-initiated inner loop.

As noted above, the example embodiment depicted via FIG. 1 defines dimensions to specify the visual analytics design space. For example, data (D) 110 specify all aspects of information representation and processing. This can include metadata properties such as measurement type (for example, ratio versus categorical data), schema, operations and transformations on data, domain specific characteristics, and semantics. Another dimension includes task (T) 114, which specifies one or more tasks, performed at multiple levels on representations of data, to reveal a desired insight. Such tasks can include overall tasks that can be broken down into sub-tasks. Also, a user (U) dimension 112 specifies aspects related to humans viewing and interacting with one or more visual representations of data. Such aspects can relate to user perception, cognition, and experience of the system, as well as user skills and performance in using the system.

As illustrated, another dimension includes medium (M) 116, which specifies physical aspects of the visualization medium, such as those aspects related to display and interaction capabilities. A visualization (V) dimension 120 specifies aspects related to visual representation of the data, such as visual elements, axes, and visual operations. Such a dimension can include low-level specifications of graphical primitives (for example, points and lines) as well as higher-level specifications of visualizations (for example, bar, pie, or line charts), and how such specifications are visually presented. Further, an interaction (I) dimension 118 specifies user actions, as well as corresponding responses, pertaining to visual elements and/or supporting widgets (such as, for example, sliders, combo-boxes, and/or other types of interactive widgets). Such a dimension can include low-level interactions (for example, a selection through a mouse click) and higher-level interactions (for example, brushing and filtering), as well as basic widgets (such as, for example, a selection box) that can be separately rendered.

In one or more embodiments of the invention, such dimensions can be combined to serve as the operands of a visual analytics algebra, and can be expressed in terms of tuples as follows: $S_i = <D_i, T_i, U_i, M_i, V_i, I_i>$, with the index i denoting the specification of the design space at the ith iteration in the visual analytics process. By way merely of example, at the beginning of the visual analytics process, specifications can be initialized as: $S_0 = <D_0, T_0, U_0, M_0, \{\ \}, \{\ \}>$, with pre-conditions pertaining to the data, task, user, and medium, but no details about the visualization or interaction therewith.

It is also noted that, in one or more embodiments of the invention, specifications are hierarchical in nature. For example, a visualization can be broken down as a hierarchy of visual representations and/or data organized into different buckets, potentially offering different interactive capabilities at different levels, serving lower-level tasks within a higher-level task.

Design guidelines ($\Gamma$) 128 can be modeled as operators that encode, for example, human perception, information organization, data attributes and semantics, and device characteristics. As such, design guidelines can codify when a particular guideline is applicable and how that guideline transforms an input specification into an output specification. Such codification can refer to any part of the specification (points of a visualization, specific attribute measurement type, etc.). Additionally, in at least one embodiment of the invention, design guidelines can be defined as: $S_i = \Gamma_i(S_{i-1})$.

Further, design guidelines not only can incorporate all elements of the specification, but also can put such a specification in the context of interactions between these elements. Such a context of interaction can refer to the fact that some of the elements in the specification might be interaction effects. That is, when considered independently, those elements might yield something undesirable (an "interaction effect"), but when considered jointly, such elements might yield better results. For example, a particular visualization technique might be more suitable if the user is an expert and the device display is large, while either one of those two elements alone might render the same visualization technique less useful. Like operands, operators can also address different levels of the specification. For example, a low-level design guideline can pertain to the color of the points in a visualization, how data should be filtered, etc. A higher-level design guideline, in contrast, might pertain to how a high-level task such as comparison is supported through the use of multiple visualizations arranged on a layout, working in a coordinated manner. By way merely of illustration, consider an example wherein a design guideline such as "Always extend bar charts to zero baseline for effective comparison of data" can be applicable if the visualization part of the specification contains bars as visual elements, and such a design guideline transforms the axis of the visualization to start from zero as the baseline in order to better support a high-level task such as comparison.

By applying such operators iteratively, a specification that initially describes data, user, task, and medium dimensions can be incrementally transformed into an interactive visualization, with more details emerging specifically on data, visualization, and interaction dimensions. As illustrated in FIG. 1, one or more embodiments of the invention distinguish between an inner loop 106 and an outer loop 102 in the design process. At a high level of illustration, the inner loop 106 can correspond to system-driven actions and the outer loop 102 can correspond to human-driven contributions to the process, respectively.

Given a consistent specification of the user, the task, and the medium, the inner loop 106 can apply design guidelines 128 to transform the data, visualization, and interaction dimensions to satisfy conditions as follows:

$$S_i = <D_i, *, *, *, V_i, I_i>$$
$$= \Gamma_i^\circ(<D_{i-1}, *, *, *, V_{i-1}, I_{i-1}>)$$
$$= \Gamma_i^\circ(S_{i-1}),$$

with ○ denoting the inner loop, $\Gamma_i^\circ$ denoting a guideline specific to the inner loop, and * denoting that these elements of the specification are not updated within the inner loop. The "elements" referenced in this example include <D, T, U, M, V, I>; therefore, the elements represented by the "*" symbol include, in this example, task, user, and medium. While, in the above-noted example, refinements on task specification are limited to humans, it is to be appreciated that, in one or more embodiments of the invention, intelligent systems can propose one or more refinements on $T_{i-1}$ as well.

As detailed herein, the outer loop encapsulates the inner loop and captures the interaction of the user with the system. As the visual analytics design process progresses, the outer loop reflects changes in the data (such as, for example, changes based on an updated or new data set), changes to the user (for example, a new user or an updated user preference learned from user interaction), changes to the task (for example, a refined or new task), and changes to the medium (for example, a change of window size or a device change). In at least one embodiment of the invention, the outer loop can be specified as follows:

$$S_i = <D_i, U_i, T_i, M_i, *, *>$$
$$= \Gamma_i^\odot(<D_{i-1}, U_{i-1}, T_{i-1}, M_{i-1}, *, *>)$$
$$= \Gamma_i^\odot(S_{i-1}),$$

with ⊙ denoting the outer loop, $\Gamma_i^\odot$ denoting a guideline specific to the outer loop, and * denoting that these elements of the specification are not updated within the outer loop. While such a process can be automated, in one or more embodiments of the invention, such a process can also be a mixed-initiative process, wherein intermediate representations of the specification, along with potential operators, can be shown (interactively) to users as the process progresses.

Figure 2:
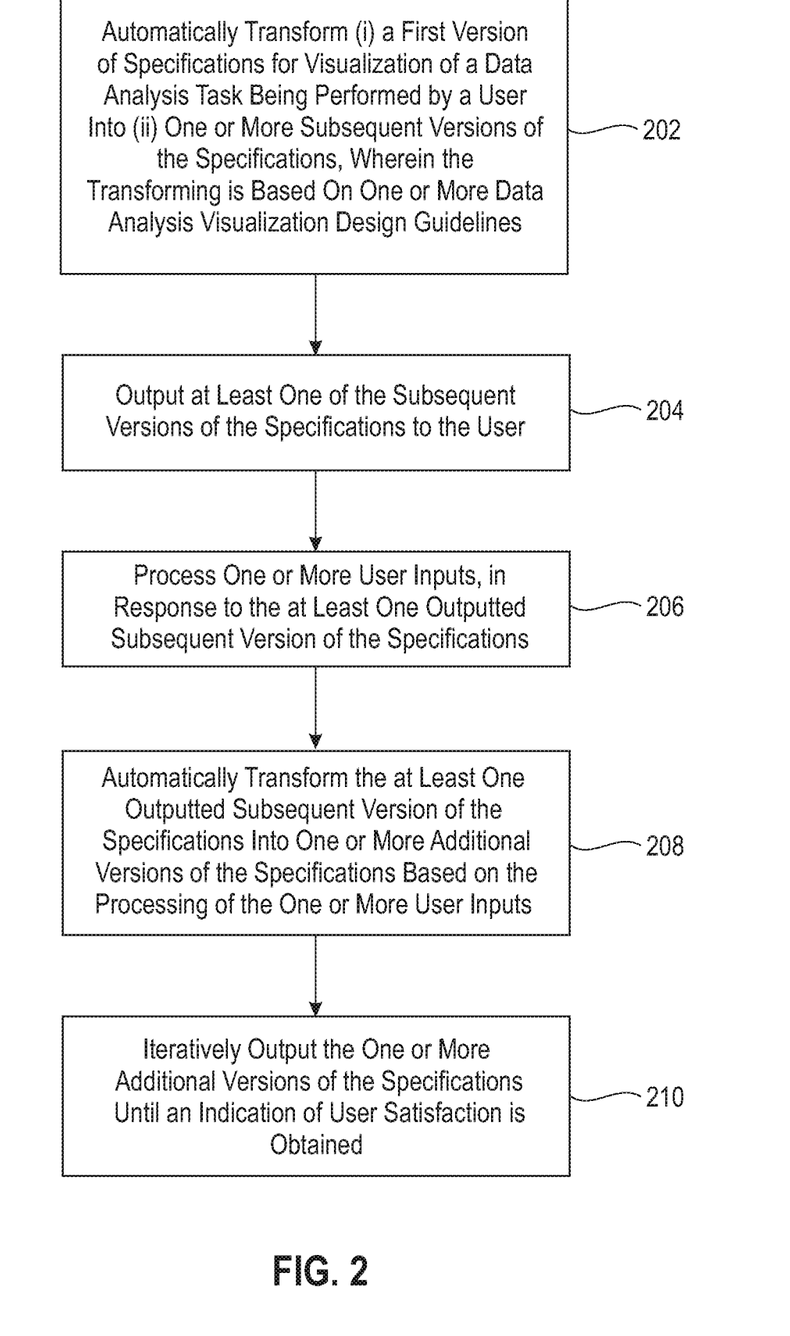
FIG. 2 is a flow diagram illustrating techniques according to an embodiment of the invention.

FIG. 2 is a flow diagram illustrating techniques according to an embodiment of the present invention. Step 202 includes automatically transforming (i) a first version of specifications for visualization of a data analysis task being performed by a user into (ii) one or more subsequent versions of the specifications, wherein the transforming is based on one or more data analysis visualization design guidelines. The specifications can include a description of characteristics of the data analysis task, a description of characteristics of the user performing the data analysis task, a description of characteristics of the data to be analyzed in connection with the data analysis task, a description of characteristics of the one or more devices upon which the data analysis task is to be conducted, a description of characteristics of one or more interaction requirements pertaining to (i) the user performing the data analysis task and (ii) the one or more devices upon which the data analysis task is to be conducted, and/or a description of characteristics of a medium pertaining to the data analysis task.

Additionally, the one or more data analysis visualization design guidelines can include one or more declarative languages that describe (i) one or more constraints on applicability and (ii) one or more actions that transform the specifications. Further, the one or more data analysis visualization design guidelines can include one or more domain-specific data analysis visualization design guidelines and/or one or more end-user editable data analysis visualization design guidelines.

Step 204 includes outputting at least one of the subsequent versions of the specifications to the user. The at least one outputted subsequent version of the specifications can include at least one visual version of the specifications at least one interactive version of the specifications. Step 206 includes processing one or more user inputs, in response to the at least one outputted subsequent version of the specifications. The one or more user inputs can include one or more user-initiated transformations to the at least one outputted subsequent version of the specification.

Step 208 includes automatically transforming the at least one outputted subsequent version of the specifications into one or more additional versions of the specifications based on the processing of the one or more user inputs. Step 210 includes iteratively outputting the one or more additional versions of the specifications until an indication of user satisfaction is obtained.

The techniques depicted in FIG. 2 can additionally include rendering each of the versions of the specifications into interactive visual representations of data, as well as storing each of the versions of the specifications in a repository.

Also, an additional embodiment of the invention includes step (a): generating, in connection with a data analysis task being performed by a user, a first version of specifications for the data analysis task, wherein the specifications describe characteristics of (i) a visual display of data being analyzed in connection with the data analysis task and (ii) one or more interactions that support the data analysis task on the visual display. Such an embodiment can also include step (b): transforming, automatically via at least one computing device, the first version of the specifications into a second version of the specifications based on one or more data analysis visualization design guidelines; and step (c): outputting the second version of the specifications to the user via a display of a user device. Additionally, such an embodiment can also include step (d): updating at least a portion of the second version of the specifications, based on input from the user, thereby creating an updated second version of the specifications; and step (e): transforming, automatically via the at least one computing device, the updated second version of the specifications into a third version of the specifications based on the input from the user. Further, such an embodiment can include step (f): outputting the third version of the specifications to the user via a display of a user device; and step (g): iterating step (d), step (e) and step (f) until an indication of satisfaction by the user is obtained. Also, in such an embodiment, step (d) can be carried out via a user interface of the at least one computing device.

In such an embodiment (as well as one or more additional embodiments) of the invention, generating the first version of specifications can include implementing a unifying formal language to represent all of the characteristics of (i) a visual display of data being analyzed in connection with the data analysis task and (ii) one or more interactions that support the data analysis task on the visual display. One or more such embodiments can additionally include optimizing one or more subsequent steps of the data analysis task based on concurrent consideration, via the unifying formal language, of all of the characteristics of (i) a visual display of data being analyzed in connection with the data analysis task and (ii) one or more interactions that support the data analysis task on the visual display.

At least one embodiment of the invention (such as the techniques depicted in FIG. 2, for example), can include implementing a service via a transmission server to receive data from a data source and send selected data to users (for example, at a provided destination address of a wireless device (such as a number for a cellular phone, etc.)). The transmission server includes a memory, a transmitter, and a microprocessor. Such an embodiment of the invention can also include providing a viewer application to the users for installation on their individual devices. Additionally, in such an embodiment of the invention, after a user enrolls, the service receives visual analytics specifications sent from a data source to the transmission server. The server can process the information, for example, based upon user-provided user preference information that is stored in memory on the server. Subsequently, an alert is generated containing one or more updated versions of the visual analytics specifications. The alert can be formatted into data blocks, for example, based upon any provided alert format preference information. Subsequently, the alert and/or formatted data blocks are transmitted over a data channel to the user's wireless device. After receiving the alert, the user can connect the wireless device to the user's computer, whereby the alert causes the user's computer to automatically launch the application provided by the service to display the alert. When connected to the Internet, the user may then use the viewer application (for example, via clicking on a URL associated with the data source provided in the alert) to facilitate a connection from the remote user computer to the data source over the Internet for additional information.

The techniques depicted in FIG. 2 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 2 can be implemented via a computer program product that can include computer usable program code that is stored in a computer readable storage medium in a data processing system, and wherein the computer usable program code was downloaded over a network from a remote data processing system. Also, in an embodiment of the invention, the computer program product can include computer usable program code that is stored in a computer readable storage medium in a server data processing system, and wherein the computer usable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 3:
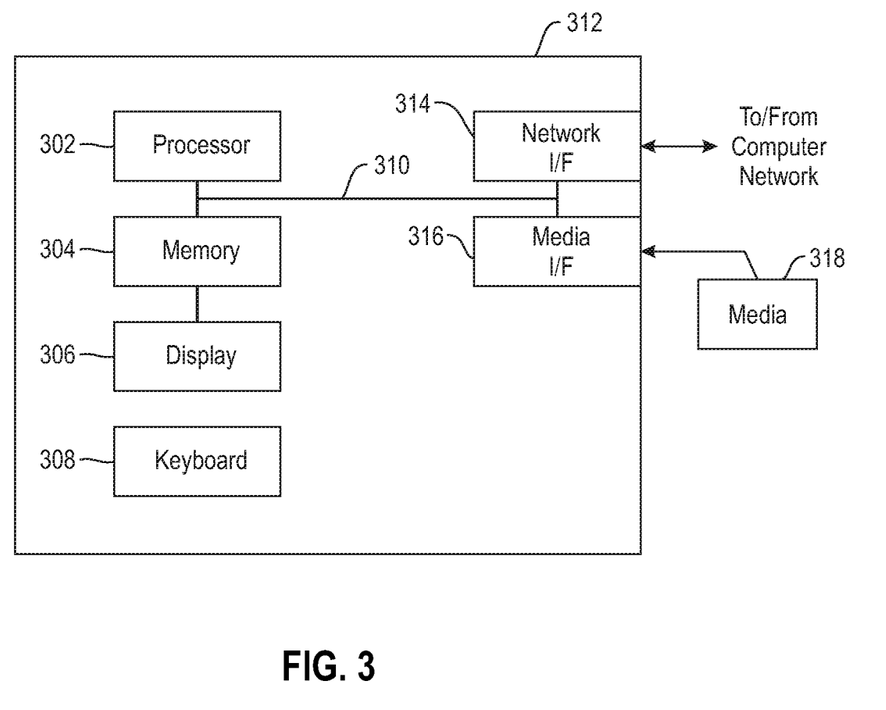
FIG. 3 is a system diagram of an exemplary computer system on which at least one embodiment of the invention can be implemented.

Additionally, an embodiment of the present invention can make use of software running on a computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 302. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
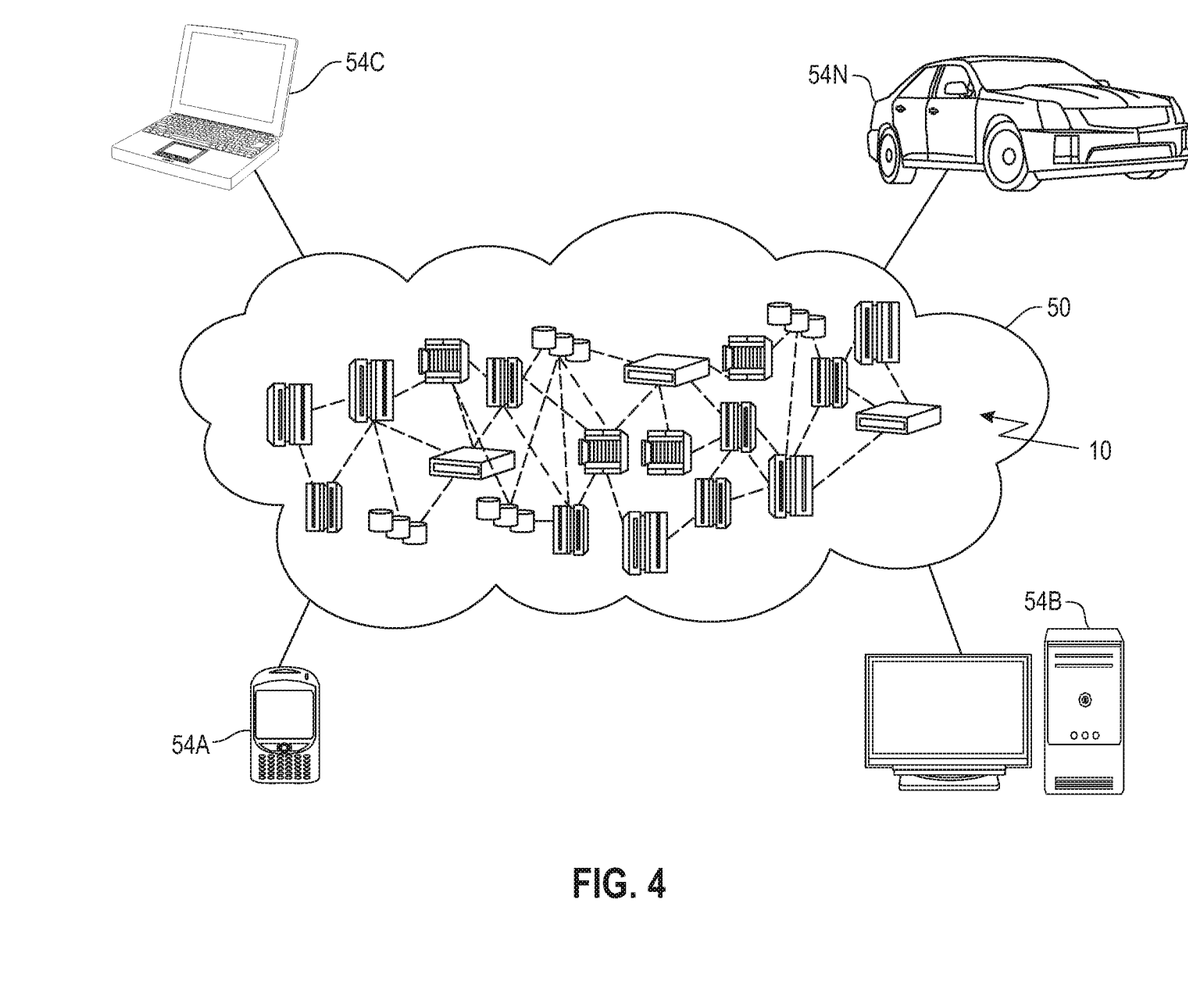
FIG. 4 depicts a cloud computing environment according to an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
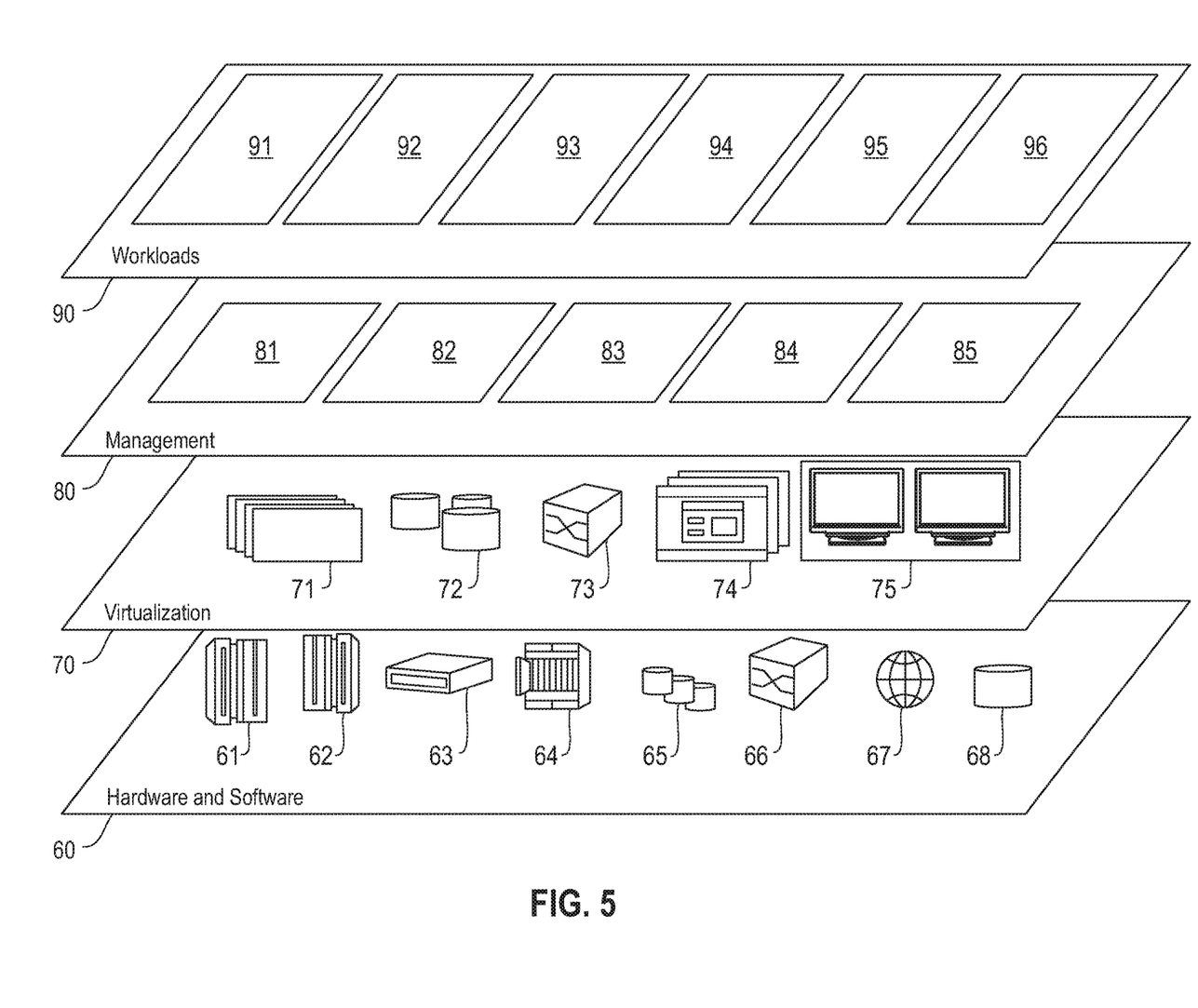
FIG. 5 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and semi-automated visual analytics 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, generating a mixed initiative system and method to iteratively transform and guide a visual analytics process.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

automatically transforming (i) a first version of specifications for visualization of one or more steps of a data analysis task being performed by multiple collaborative users into (ii) one or more subsequent versions of the specifications, wherein each of the first version and each of the one or more subsequent versions is defined as a tuple comprising, at least:

a first term indicative of a description of characteristics of the data analysis task;

a second term indicative of a description of characteristics of the multiple collaborative users performing the data analysis task, wherein said characteristics of the multiple collaborative users comprise (i) user experience and (ii) user skills;

a third term indicative of a description of characteristics of the data to be analyzed in connection with the data analysis task, wherein said characteristics of the data comprise metadata properties pertaining to (i) measurement types comprising ratio measurements and categorical data measurements, (ii) schema, (iii) one or more operations, (iv) one or more transformations on data, (v) one or more domain-specific characteristics, and (vi) semantics;

a fourth term indicative of a description of characteristics of the one or more devices upon which the data analysis task is to be conducted, wherein said characteristics of the one or more devices comprise (i) display capabilities and (ii) interaction capabilities;

a fifth term indicative of a description of visualization characteristics related to visual representation of data, wherein said characteristics related to visual representation of data comprise information pertaining to visual elements comprising points, lines, and chart types, information pertaining to axes, and information pertaining to one or more visual operations; and a sixth term indicative of a description of interaction characteristics that specify permissible user actions and user responses, wherein said characteristics that specify permissible user actions and user responses comprise information pertaining to visual elements and supporting widgets comprising one or more of sliders, combo-boxes, and mouse clicks, and wherein the transforming is based on the first version of specifications and one or more data analysis visualization design guidelines specified in a computer-interpretable language for iteratively transforming the tuple corresponding to said first version to the one or more tuples corresponding to said one or more subsequent versions;

outputting at least one of the subsequent versions of the specifications to the multiple collaborative users;

processing multiple user inputs from multiple distinct collaborative user devices associated with the multiple collaborative users that modify at least one of the terms of the tuple corresponding to the at least one outputted subsequent version of the specifications;

automatically and incrementally transforming the at least one outputted subsequent version of the specifications into one or more additional versions of the specifications based on the at least one outputted subsequent version and the processing of the multiple user inputs; and iteratively outputting the one or more additional versions of the specifications until an indication of user satisfaction is obtained from the multiple collaborative users;

wherein the method is carried out by at least one computing device.

2. The computer-implemented method of claim 1, wherein the at least one outputted subsequent version of the specifications comprises at least one visual version of the specifications.

3. The computer-implemented method of claim 1, wherein the at least one outputted subsequent version of the specifications comprises at least one interactive version of the specifications.

4. The computer-implemented method of claim 1, wherein the specifications further comprise a description of characteristics of one or more interaction requirements pertaining to the multiple collaborative users performing the data analysis task.

5. The computer-implemented method of claim 1, wherein the specifications further comprise a description of characteristics of one or more interaction requirements pertaining to the one or more devices upon which the data analysis task is to be conducted.

6. The computer-implemented method of claim 1, wherein the specifications further comprise a description of characteristics of a medium pertaining to the data analysis task.

7. The computer-implemented method of claim 1, wherein the computer-interpretable language comprises one or more declarative languages that describe one or more constraints on applicability.

8. The computer-implemented method of claim 1, wherein the computer-interpretable language comprises one or more declarative languages that describe one or more actions that transform the specifications.

9. The computer-implemented method of claim 1, wherein the one or more data analysis visualization design guidelines comprise one or more domain-specific data analysis visualization design guidelines.

10. The computer-implemented method of claim 1, wherein the one or more data analysis visualization design guidelines comprise one or more end-user editable data analysis visualization design guidelines.

11. The computer-implemented method of claim 1, wherein the multiple user inputs comprise one or more user-initiated transformations to the at least one outputted subsequent version of the specification.

12. The computer-implemented method of claim 1, comprising:

rendering each of the versions of the specifications into interactive visual representations of data.

13. The computer-implemented method of claim 1, comprising:

storing each of the versions of the specifications in a repository.

14. A computer program product comprising a computer readable storage medium having program instructions embodied therewith, the program instructions executable by a device to cause the device to:

automatically transform (i) a first version of specifications for visualization of one or more steps of a data analysis task being performed by a multiple collaborative users into (ii) one or more subsequent versions of the specifications, wherein the transforming is incremental and based on the first version of the specifications, wherein each of the first version and each of the one or more subsequent versions is defined as a tuple comprising, at least:

a first term indicative of description of characteristics of the data analysis task;

a second term indicative of a description of characteristics of the multiple collaborative users performing the data analysis task, wherein said characteristics of the multiple collaborative users comprise (i) user experience and (ii) user skills;

a third term indicative of a description of characteristics of the data to be analyzed in connection with the data analysis task, wherein said characteristics of the data comprise metadata properties pertaining to (i) measurement types comprising ratio measurements and categorical data measurements, (ii) schema, (iii) one or more operations, (iv) one or more transformations on data, (v) one or more domain-specific characteristics, and (vi) semantics;

a fourth term indicative of a description of characteristics of the one or more devices upon which the data analysis task is to be conducted, wherein said characteristics of the one or more devices comprise (i) display capabilities and (ii) interaction capabilities;

a fifth term indicative of a description of visualization characteristics related to visual representation of data, wherein said characteristics related to visual representation of data comprise information pertaining to visual elements comprising points, lines, and chart types, information pertaining to axes, and information pertaining to one or more visual operations; and a sixth term indicative of a description of interaction characteristics that specify permissible user actions and user responses, wherein said characteristics that specify permissible user actions and user responses comprise information pertaining to visual elements and supporting widgets comprising one or more of sliders, combo-boxes, and mouse clicks, and wherein the transformation is based on the first version of specifications and one or more data analysis visualization design guidelines specified in a computer-interpretable language for iteratively transforming the tuple corresponding to said first version to the one or more tuples corresponding to said one or more subsequent versions;

output at least one of the subsequent versions of the specifications to the multiple collaborative users;

process multiple user inputs from multiple distinct collaborative user devices associated with the multiple collaborative users that modify at least one of the terms of the tuple corresponding to the at least one outputted subsequent version of the specifications;

automatically and incrementally transform the at least one outputted subsequent version of the specifications into one or more additional versions of the specifications based on the at least one outputted subsequent version and the processing of the multiple user inputs; and iteratively output the one or more additional versions of the specifications until an indication of user satisfaction is obtained from the multiple collaborative users.

15. The computer program product of claim 14, wherein the program instructions executable by a computing device further cause the computing device to:

render each of the versions of the specifications into interactive visual representations of data.

16. The computer program product of claim 14, wherein the program instructions executable by a computing device further cause the computing device to:
store each of the versions of the specifications in a repository.

17. A system comprising:
a memory; and
at least one processor operably coupled to the memory and configured for:
automatically transforming (i) a first version of specifications for visualization of one or more steps of a data analysis task being performed by a multiple collaborative users into (ii) one or more subsequent versions of the specifications, wherein the transforming is incremental and based on the first version of the specifications, wherein each of the first version and each of the one or more subsequent versions is defined as a tuple comprising, at least:
a first term indicative of a description of characteristics of the data analysis task;
a second term indicative of a description of characteristics of the multiple collaborative users performing the data analysis task, wherein said characteristics of the multiple collaborative users comprise (i) user experience and (ii) user skills;
a third term indicative of a description of characteristics of the data to be analyzed in connection with the data analysis task, wherein said characteristics of the data comprise metadata properties pertaining to (i) measurement types comprising ratio measurements and categorical data measurements, (ii) schema, (iii) one or more operations, (iv) one or more transformations on data, (v) one or more domain-specific characteristics, and (vi) semantics;
a fourth term indicative of a description of characteristics of the one or more devices upon which the data analysis task is to be conducted, wherein said characteristics of the one or more devices comprise (i) display capabilities and (ii) interaction capabilities;
a fifth term indicative of a description of visualization characteristics related to visual representation of data, wherein said characteristics related to visual representation of data comprise information pertaining to visual elements comprising points, lines, and chart types, information pertaining to axes, and information pertaining to one or more visual operations; and
a sixth term indicative of a description of interaction characteristics that specify permissible user actions and user responses, wherein said characteristics that specify permissible user actions and user responses comprise information pertaining to visual elements and supporting widgets comprising one or more of sliders, combo-boxes, and mouse clicks, and
wherein the transformation is based on the first version of specifications and one or more data analysis visualization design guidelines specified in a computer-interpretable language for iteratively transforming the tuple corresponding to said first version to the one or more tuples corresponding to said one or more subsequent versions;
outputting at least one of the subsequent versions of the specifications to the multiple collaborative users;
processing multiple user inputs from multiple distinct collaborative user devices associated with the multiple collaborative users that modify at least one of the terms of the tuple corresponding to the at least one outputted subsequent version of the specifications;
automatically and incrementally transforming the at least one outputted subsequent version of the specifications into one or more additional versions of the specifications based on the at least one outputted subsequent version and the processing of the multiple user inputs; and
iteratively outputting the one or more additional versions of the specifications until an indication of user satisfaction is obtained from the multiple collaborative users.

\* \* \* \* \*